US008428633B2

(12) United States Patent
Zhu et al.

(10) Patent No.: US 8,428,633 B2
(45) Date of Patent: Apr. 23, 2013

(54) COMBINED CHANNEL STATE INFORMATION AND COMBINED CHANNEL QUALITY INDICATOR IN WIRELESS COMMUNICATION SYSTEMS

(75) Inventors: Yuan Zhu, Beijing (CN); Qinghua Li, San Ramon, CA (US); Xiaogang Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 162 days.

(21) Appl. No.: 12/873,006

(22) Filed: Aug. 31, 2010

(65) Prior Publication Data

US 2012/0052901 A1   Mar. 1, 2012

(51) Int. Cl.
*H04B 7/00* (2006.01)
*H04B 17/00* (2006.01)

(52) U.S. Cl.
USPC .......................................... 455/517; 455/67.13

(58) Field of Classification Search .......................... None
See application file for complete search history.

(56) References Cited

U.S. PATENT DOCUMENTS

| | | | |
|---|---|---|---|
| 2006/0035608 A1* | 2/2006 | Zhang et al. | 455/129 |
| 2007/0298728 A1* | 12/2007 | Imamura et al. | 455/77 |
| 2008/0080635 A1* | 4/2008 | Hugl et al. | 375/267 |
| 2009/0003475 A1* | 1/2009 | Erceg et al. | 375/260 |
| 2009/0059844 A1 | 3/2009 | Ko et al. | |
| 2009/0179797 A1 | 7/2009 | Kwon et al. | |
| 2009/0280747 A1* | 11/2009 | Sudarshan et al. | 455/63.1 |
| 2010/0091678 A1 | 4/2010 | Chen et al. | |
| 2010/0172432 A1 | 7/2010 | Li et al. | |
| 2010/0272019 A1* | 10/2010 | Papasakellariou et al. | 370/328 |

OTHER PUBLICATIONS

International Search Report mailed Feb. 17, 2012 in International Application No. PCT/US2011/049488.

* cited by examiner

*Primary Examiner* — Yuwen Pan
*Assistant Examiner* — Ayodeji Ayotunde
(74) *Attorney, Agent, or Firm* — Schwabe, Williamson & Wyatt, P.C.

(57) ABSTRACT

Embodiments of methods and apparatus for estimating a channel state information (CSI) and a channel quality indicator (CQI) of a frame; determining a combined CSI and a combined CQI of the frame; and transmitting the CSI and the combined CQI are disclosed. Additional variants and embodiments are also disclosed.

16 Claims, 5 Drawing Sheets

COMBINED CHANNEL STATE INFORMATION AND COMBINED CHANNEL QUALITY INDICATOR IN WIRELESS COMMUNICATION SYSTEMS

TECHNICAL FIELD

Embodiments of the present disclosure relate generally to wireless communication systems, and more particularly, to methods and apparatuses for determining combined channel state information (CSI) and combined channel quality indicator (CQI) in wireless communication systems.

BACKGROUND

A mobile station in a closed-loop multi input and/or multi output (MIMO) system generally transmits channel state information (CSI) and/or channel quality indicator (CQI) to a base station over a feedback path. The CSI and the CQI are used to employ beamforming at the base station, to compensate for the current channel conditions.

BRIEF DESCRIPTION OF THE DRAWINGS

Embodiments of the present disclosure will be described by way of exemplary embodiments, but not limitations, illustrated in the accompanying drawings in which like references denote similar elements, and in which.

DETAILED DESCRIPTION

Figure 1:
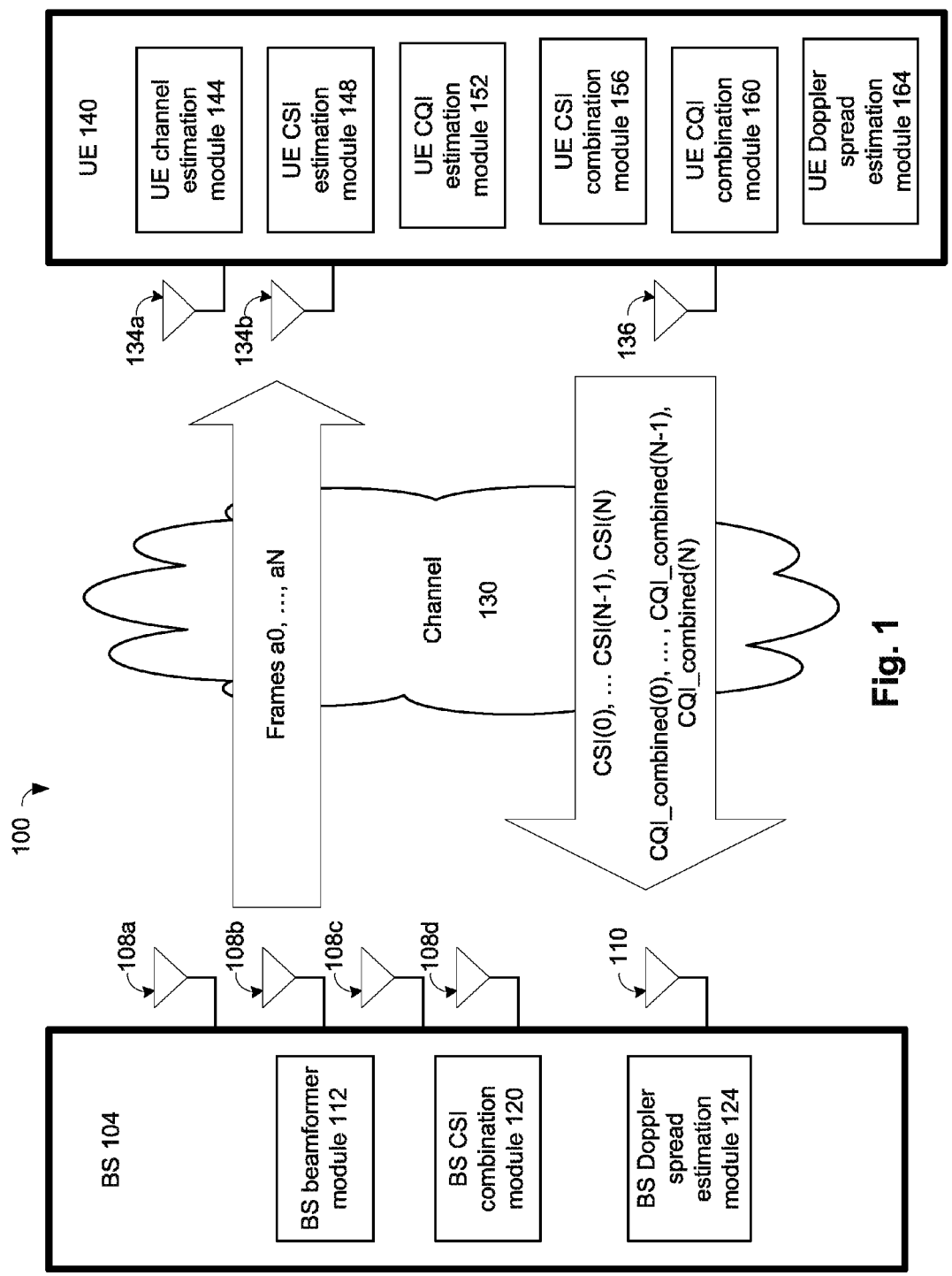
FIG. 1 schematically illustrates a communication system, in accordance with various embodiments of the present disclosure.

Illustrative embodiments of the present disclosure include, but are not limited to, methods and apparatuses for generating combined CSI and combined CQI in wireless communication systems.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "NB" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

Embodiments of the present disclosure may be used in wireless access networks that employ orthogonal frequency division multiple access (OFDMA) communications as used by multicarrier transmission schemes presented in, e.g., the Institute of Electrical and Electronics Engineers (IEEE) 802.16-2009, approved May 13, 2009, along with any amendments, updates, and/or revisions (e.g., 802.16m, which is presently at predraft stage), 3rd Generation Partnership Project (3GPP) long-term evolution (LTE) project, advanced LTE project, ultra mobile broadband (UMB) project (also referred to as "3GPP2"), Worldwide Interoperability for Microwave Access (WiMAX), etc. In other embodiments, communications may be compatible with additional/alternative communication standards and/or specifications.

FIG. 1 schematically illustrates a communication system 100, in accordance with various embodiments of the present disclosure. In various embodiments, the communication system 100 includes a base station (BS) 104 that communicates with user equipment (UE) 140 over a wireless channel 130.

In various embodiments, the BS 104 and/or the UE 140 may be MIMO devices. In various embodiments, the communication system 100 may be a closed-loop system that employs beamforming to increase a signal to noise ratio (SNR) of signals transmitted by the BS 104 to UE 140. The UE 140 may be, for example, a mobile station, a cellular or mobile phone, or any other appropriate consumer electronic device capable of wirelessly communicating with the BS 104 over the wireless channel 130 using any appropriate wireless transmission protocol. The BS 104 may be, for example, an evolved Node B (eNB) and/or any other appropriate type of base station configured to wirelessly communicate with the UE 140 over the wireless channel 130 using any appropriate wireless transmission protocol.

In various embodiments, the BS 104 may transmit one or more data streams to the mobile station 140, which may be appropriately weighted prior to transmission by the BS 104. In various embodiments, the BS 104 may include a beamformer module 112 to weight data signals by a beamforming matrix. The term beamforming is used herein to describe the application of beamforming coefficients or weights to frequency-domain signals in the data stream(s), prior to transmission. In various embodiments, the beamforming coefficients or weights may be determined from the beamforming matrix.

BS 104 may comprise a plurality of transmit antennas 108a, 108b, 108c and 108d, to transmit the weighted data stream. In FIG. 1, four transmit antennas are illustrated, although in various other embodiments, any other suitable number of transmit antennas may be included in the BS 104. In various embodiments, the BS 104 may include at least as many transmit antennas as the number of data stream(s) being transmitted by BS 104, although the scope of the present disclosure may not be limited in this respect.

In various embodiments, the BS 104 may transmit the weighted data stream(s) in a form of frames. For example, the BS 104 may transmit a plurality of frames a0, . . . , aN, as illustrated in FIG. 1. Individual frames may include one or more packets of data. In various embodiments, frames a0, . . . , aN may be transmitted sequentially. For example, frame a1 may be transmitted subsequent to transmitting frame a0, frame a2 may be transmitted subsequent to transmitting frame a1, . . . , frame aN may be transmitted subsequent to transmitting frame a(N−1), and so on. Although only frames a0, . . . , aN are illustrated to be transmitted from the BS 104 to the UE 140, there may be one or more frames transmitted prior to transmitting frame a0, one or more frames transmitted subsequent to transmitting frame aN, and/or one or more frames interleaved in between the frames a0, . . . , aN. For example, in some embodiments, one or more frames may be transmitted in between transmitting frames a0 and a1.

The BS 104 may also include one or more receive antennas (e.g., receive antenna 110) that may receive, among other information, feedback about the channel condition from the UE 140.

The BS 104 may also include a BS CSI combination module 120 and a BS Doppler spread estimation module 124, functions of which will be discussed herein later.

In various embodiments, the UE 140 may include one or more receive antennas, e.g., receive antennas 134a and 134b, configured to receive signals transmitted through channel 130 by the BS 104. In FIG. 1, two receive antennas are illustrated, although in various other embodiments, any other suitable number of receive antennas may be used. In various embodiments, the UE 140 may include at least as many receive antennas as the number of data stream(s) being transmitted by the BS 104, although the scope of the present disclosure may not be limited in this respect. The UE 104 may also include one or more transmit antennas (e.g., transmit antenna 136) to transmit, among other information, feedback about the channel condition to the BS 104.

In various embodiments, the UE 140 may also include a UE channel estimation module 144 to estimate channel conditions of the channel 130, based at least in part on receiving frames a0, . . . , aN from one or more of the transmit antennas 108a, . . . , 108d. For example, the UE channel estimation module 144 may estimate a channel matrix H which describes the current state of channel 130. In various embodiments, the channel matrix H may be indicative of conditions of subchannels between each of the transmit antennas 108a, . . . , 108d and each of the receive antennas 134a and 134b. In various embodiments, the channel matrix H may be of the order $N_r$ by $N_t$, where $N_r$ may be a number of receive antennas in the UE 140 and where $N_t$ may be a number of transmit antennas in the BS 104. FIG. 1 illustrates four transmit antennas 108a, . . . , 108d of the BS 104 (i.e., $N_t$=4) and two receive antennas 134a and 134b of the UE 140 (i.e., $N_r$=2), and accordingly, the channel matrix H may be a 2 by 4 matrix for the MIMO communication system 100.

In various embodiments, the UE channel estimation module 144 may estimate the channel matrix H for individual frames of the received frames a0, . . . , aN. For example, based at least in part on receiving frames a0, . . . , aN, the UE channel estimation module 144 may estimate channel matrices H(0), . . . , H(N), respectively.

In various embodiments, the UE may also include a UE CSI estimation module 148, which may be configured to estimate CSIs associated with one or more frames received by the UE 140. This estimation may be based on the channel matrix H. For example, the UE CSI estimation module 148 may estimate CSI(0), . . . , CSI(N) associated with frames a0, . . . , aN, respectively, based on channel matrices H(0), . . . , H(N), respectively, using any appropriate CSI estimation technique. For example, for a frame ai, the CSI(i) may be estimated as $$CSI(i) = \underset{v \in C_{i,r}}{\mathrm{argmax}}\, func(H(i), r, v), \qquad \text{Equation (1)}$$

where H(i) is the channel matrix that is estimated based on receiving the frame ai, r is a transmission rank at the BS 104, $C_{i,r}$ is a codebook used to estimate the CSI(i) associated with frame ai, and func( . . . ) is any appropriate function for estimating CSI(i). The codebook $C_{i,r}$ may be used to populate the surface of a manifold to efficiently encode the CSI(i). The codebook $C_{i,r}$ may include a plurality of candidate matrices, each having dimensions similar to that of the CSI(i). A candidate matrix, among the plurality of candidate matrices in $C_{i,r}$, which maximizes the func(H(i),r,v) of equation (1) may be selected from the codebook $C_{i,r}$ as CSI(i). In various embodiments, the same codebook $C_{i,r}$ may be used to estimate CSI(0), . . . , CSI(N), although in some other embodiments, different codebooks may also be used.

The dimension of the CSIs associated with various frames may be based at least in part on the number of transmit antennas $N_t$ of the BS 104 (e.g., in FIG. 1, $N_t$=4) and the transmission rank r of the BS 104. For example, the CSIs associated with various frames may be precoding matrices with dimension of $N_t$ by r.

In various embodiments, the UE 140 may also include a UE CQI estimation module 152, which may be configured to estimate CQIs associated with one or more frames received by the UE 140. For example, the UE CQI estimation module 152 may estimate CQI(0), . . . , CQI(N) associated with frames a0, . . . , aN, respectively. In various embodiments, a CQI(i) associated with a frame ai may be estimated based at least in part on H(i), CSI(i), a signal-to-noise ratio (SNR), a signal-to-interference plus noise ratio (SINR), a signal-to-noise plus distortion ratio (SNDR), Doppler shift, channel estimation error, interference, and so forth of the wireless channel 130 while receiving frame ai. In various embodiments, the UE CQI estimation module 152 may estimate CQIs using any technique appropriate for estimating CQIs.

In various embodiments, the UE 140 may also include a UE CSI combination module 156 that is configured to combine CSIs of one or more frames received by the UE 140. For example, for a frame ai, a combined CSI (represented as CSI_combined(i)) may be based at least in part on the CSIs of the frame ai and one or more frames received prior to receiving the frame ai. For example, $$CSI\_combined(i) = \sum_{j=0}^{K-1} b_j \times CSI(i-j), \qquad \text{Equation (2)}$$

where i is the index of the frame ai; b0, . . . , b(K−1) are weighting coefficients, and K is an integer that is equal to a number of frames (including the current frame ai and one or more frames received prior to receiving the frame ai) whose CSIs are used to determine the combined CSI associated with the frame ai. In various embodiments, $$\sum_{j=0}^{K-1} b_j = 1,$$

i.e., the weighting coefficients b0, . . . , b(K−1) may be normalized such that the sum of the weighting coefficients is equal to 1. Equation 2 may be expanded as follows:

CSI_combined(*i*)=(*b*0×CSI(*i*))+ . . . +(*b*(*K*−1)×CSI(*i*−(*K*−1))).  Equation (3)

For the purpose of the present disclosure and unless otherwise disclosed, while determining the combined CQI for a frame ai, the frame ai is referred to as a current frame; and one or more frames, which are received prior to receiving the current frame ai and whose CQIs are used to determine the CSI_combined(i), are referred to as past frames. That is, frames a(i−1), a(i−2), . . . , a(i−(K−1)) are referred to as past frames while determining the combined CQI for the current frame ai.

In various embodiments, the UE 140 also includes a UE Doppler Spread estimation module 164, which may be configured to estimate Doppler spread of the channel 130 between the BS 104 and the UE 140 over time, based at least in part on the frames received by the UE 140 over channel 130 from the BS 104.

In various embodiments, the combined CSI of a current frame ai may be determined based at least in part on a Doppler spread of the channel 130 estimated by UE Doppler spread estimation module 164 while receiving the current frame ai. For example, when the Doppler spread is relatively high, the received signal components may change independently in phase over time, and the channel may have a relatively short coherence time. Accordingly, for relatively high Doppler spread, knowledge gained from past frames may not be relevant for the current frame (as the channel 130 may change relatively rapidly). In such a case, the CSI_combined(i) may simply be equal to CSI(i). Thus, for example, if the estimated Doppler spread is higher than a threshold value, then CSI_combined(i)=CSI(i) (i.e., b0=1, and K=1 in equations 2 and 3).

On the other hand, a relatively low Doppler spread may indicate a relatively long coherence time. Accordingly, for relatively low Doppler spread, knowledge gained from past frames may be relevant for the current frame (as the channel 130 may change relatively slowly). In such a case (e.g., if the Doppler spread is less than the threshold value), the CSI_combined(i) may be a weighted average of the CSIs of the current frame and one or more past frames. That is, K>1 in equations 2 and 3. As an example, K may be equal to 2 (i.e., the current frame ai and an immediately preceding frame a(i−1) are considered for determining the combined CSI for frame ai) and b0=b1=0.5. In such a case, the CSI_combined(i)=0.5×CSI(i)+0.5×CSI(i−1).

In various embodiments, the integer K and the weighting coefficients b0, . . . , b(K−1) of equations 2 and 3 may be adaptively or dynamically tuned in response to the current Doppler spread estimated by the UE Doppler Spread estimation module 164.

Referring again to FIG. 1, the UE 140 may also include a UE CQI combination module 160 that is configured to determine combined CQIs associated with one or more frames received by the UE 140. For example, UE CQI combination module 160 may determine a combined CQI for a current frame ai (also referred to as CQI_combined(i)) based at least in part on the CQI of the current frame ai (i.e., CQI(i)) and the combined CSI of the current frame ai (i.e., CSI_combined(i)).

In various embodiments, the CQI_combined(i) may be determined using any appropriate technique. For example, for a current frame ai, after determining the CSI_combined(i) (e.g., using equations 2 and 3), the UE CQI combination module 160 may determine an angle θi between the combined CSI of the current frame and the CSI of the current frame. For example, $\theta i = |(CSI(i))^H \times CSI\_combined(i)|,$  Equation (4)

where |G| represents an amplitude of G, and a matrix $(P)^H$ represents conjugate transpose of a matrix P.

The UE CQI combination module 160 may determine the CQI_combined(i) based at least in part on the angle θi and CQI(i). For example, the UE CQI combination module 160 may determine the CQI_combined(i) as $$\text{CQI\_combined}(i) = \frac{CQI(i)}{\cos^2(\theta i)}.$$  Equation (5)

Thus, the CQI_combined(i) is a ratio of (i) the CQI of the current frame ai, and (ii) a square of a cosine of an angle between the combined CSI of the current frame and the CSI of the current frame.

In various embodiments, the UE 140 may transmit the estimated CSIs of various frames (e.g., CSI(0), . . . , CSI(N)) and/or the combined CQIs of various frames (e.g., CQI_combined (0), . . . , CQI_combined (0)) to the BS 104 using the transmit antenna 136. The UE 140 may transmit the estimated CSIs and/or the combined CQI of various frames as and when the CSIs and/or the combined CQIs are estimated. For example, based on receiving frame ai, the UE may estimate and transmit the CSI(i) and/or CQI_combined(i) to the BS 104.

As previously discussed, the BS 104 may also include a BS Doppler spread estimation module 120 configured to estimate a Doppler spread of the channel 130.

The BS 104 may receive the CSIs and/or the combined CQIs of various frames, using receive antenna 110, from the UE 140. In various embodiments, the BS CSI combination module 120 may estimate the combined CSIs of various frames based at least in part on the received CSIs of various frames and a Doppler spread estimated by the BS Doppler spread estimation module 120. For a frame ai, the combined CSI estimated by the BS CSI combination module 120 is also referred to as CSI_combined_BS(i), to distinguish it from the combined CSI estimated by the UE CSI combination module 156. Thus, the BS CSI combination module 120 may estimate CSI_combined_BS(0), . . . , CSI_combined_BS(N) for frames a0, . . . , aN, respectively. In various embodiments, BS CSI combination module 120 may determine the combined CSIs of various frames using equations 2 and 3.

In various embodiments, the BS CSI combination module 120 and the UE CSI combination module 156 may be synchronized or configured such that the two modules use same parameters (e.g., similar weighting coefficients b0, . . . , b(K−1), similar value of K, and/or same threshold for comparing with the estimated Doppler spread) while determining the combined CSIs of various frames. Accordingly, in various embodiments, the combined CSIs of any frame, as determined by the BS CSI combination module 120 and the UE CSI combination module 156, may be substantially similar (e.g., CSI_combined(i) may be substantially similar to CSI_BS_combined(i)). In various embodiments, an accuracy and/or configuration of the UE Doppler spread estimation module 164 may be similar to that of the BS Doppler spread estimation module 124 (so that the two Doppler spread estimation module outputs substantially similar estimates). In various embodiments, any change in the weighting coefficients $b0, \ldots, b(K-1)$ and the integer K of equations 2 and 3 in UE 140 may be reflected in the BS 104 as well, so that the combined CSI determined at the UE 140 and BS 104 may be substantially similar. Similarly, any change in the weighting coefficients $b0, \ldots, b(K-1)$ and the integer K in BS 104 may be reflected in the UE 140 as well.

In various embodiments, based at least in part the determined combined CSI of a frame (e.g., determined by the BS CSI combination module 120) and the received combined CQI of the frame (e.g., received from the UE 140), the BS beamformer module may determine a beamforming matrix. In various embodiments, the beamforming matrix may be used to weight data stream(s), prior to transmitting the data stream(s) to the UE 140 using transmit antennas 108a, ..., 108d.

As previously discussed, in a case where the Doppler spread is relatively low, CSIs and/or CQIs of past frames may be utilized to determine the combined CSI and/or the combined CQI of the current frame. Such utilization of information of the past frame may result in relatively accurate characterization of the channel 130, assuming that the channel 130 is varying relatively slowly with time. Furthermore, estimating a CSI of a frame from a multi-description codebook, as in equation 1, may result in a quantization error in the CSI of the frame. The quantization errors in the CSIs of various frames may be independent. Accordingly, utilization of information of the past frames in determining the combined CSIs and/or combined CQIs may also result in reduction in such quantization errors.

Figure 2:
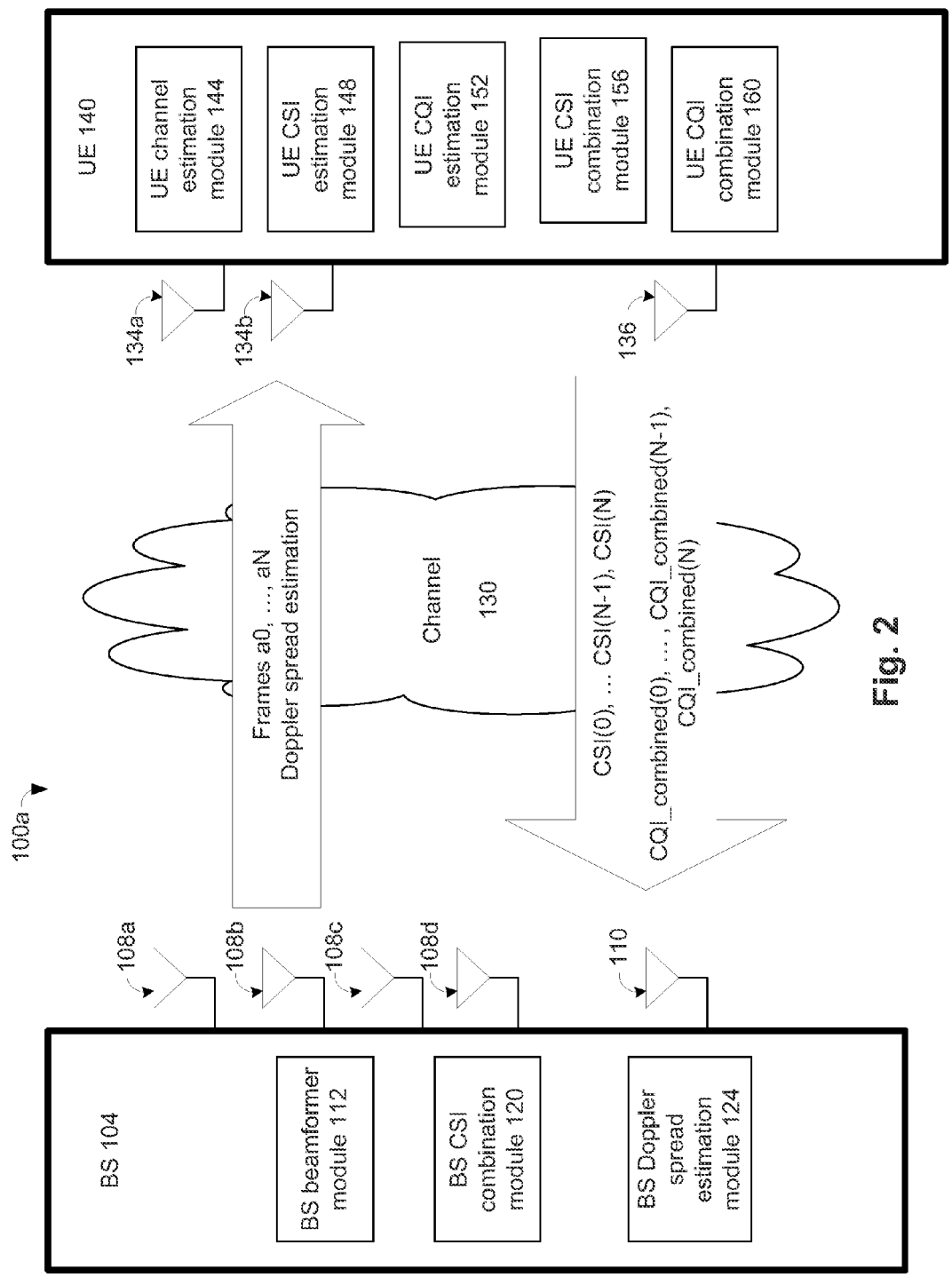
FIG. 2 schematically illustrates another communication system, in accordance with various embodiments of the present disclosure.

In FIG. 1, both the UE 140 and the BS 104 includes a Doppler spread estimation module. However, in various embodiments, only one of the UE 140 or the BS 104 may include a Doppler spread estimation module. FIG. 2 schematically illustrates a communication system 100a, in accordance with various embodiments of the present disclosure. In the communication system 100a of FIG. 2, various components are similar to corresponding components of the communication system 100 of FIG. 1. However, UE 140 of the communication system 100a of FIG. 2 does not include any Doppler spread estimation module. In the embodiments of FIG. 2, the BS 104 transmits an estimation of the Doppler spread (e.g., estimated using the BS Doppler spread estimation module 124) to the UE 140 using the transmit antennas 108a, ..., 108d, based on which the UE 140 estimates the combined CSIs for various frames (e.g., using equations 2 and 3). In various embodiments, the BS 104 may transmit a one bit estimation of the Doppler spread to the UE 140, where the one bit estimation may include information on whether the estimated Doppler spread is higher or lower than the previously discussed threshold.

Although the implementation of FIG. 2 results in reduction in hardware compared to FIG. 1, the implementation of FIG. 2 also results in an increase in data transmission from the BS 104 to the UE 140 (e.g., as a result of transmission of Doppler spread from the BS 104 to the UE 140). Inclusion or exclusion of a Doppler spread estimation module is the UE 140 is in no way limiting on the teachings of the present disclosure.

Although in FIGS. 1 and 2, the UE 140 determines the combined CSIs and the combined CQIs of various frames, such determination does not limit the teachings of the present disclosure. For example, although not illustrated in FIGS. 1 and 2, the UE 140 may transmit only the CSIs and CQIs of various frames to the BS 104 (but not the combined CQIs of various frames), from which the BS may determine the combined CQIs and the combined CSIs of various frames, and further determining the beamforming module.

In another example, although not illustrated in FIGS. 1 and 2, the UE 140 may transmit the CSIs, the combined CSIs, and/or the combined CQIs of various frames to the BS 104, from which the BS may determine the beamforming module. In these embodiments, for example, the BS CSI combination module 120 may not be present in the BS 104.

In yet another example, although not illustrated in FIGS. 1 and 2, the UE 140 may estimate the CSIs, the CQIs, the combined CQIs and/or the combined CSIs of various frames, and may also determine the resulting beamforming matrix, and transmit the determined beamforming matrix (or an index associated with the determined beamforming matrix) to the BS 104.

In other embodiments, the combined CQIs and/or CSIs may be determined in other ways by the UE 140 and/or the BS 104.

Figure 3:
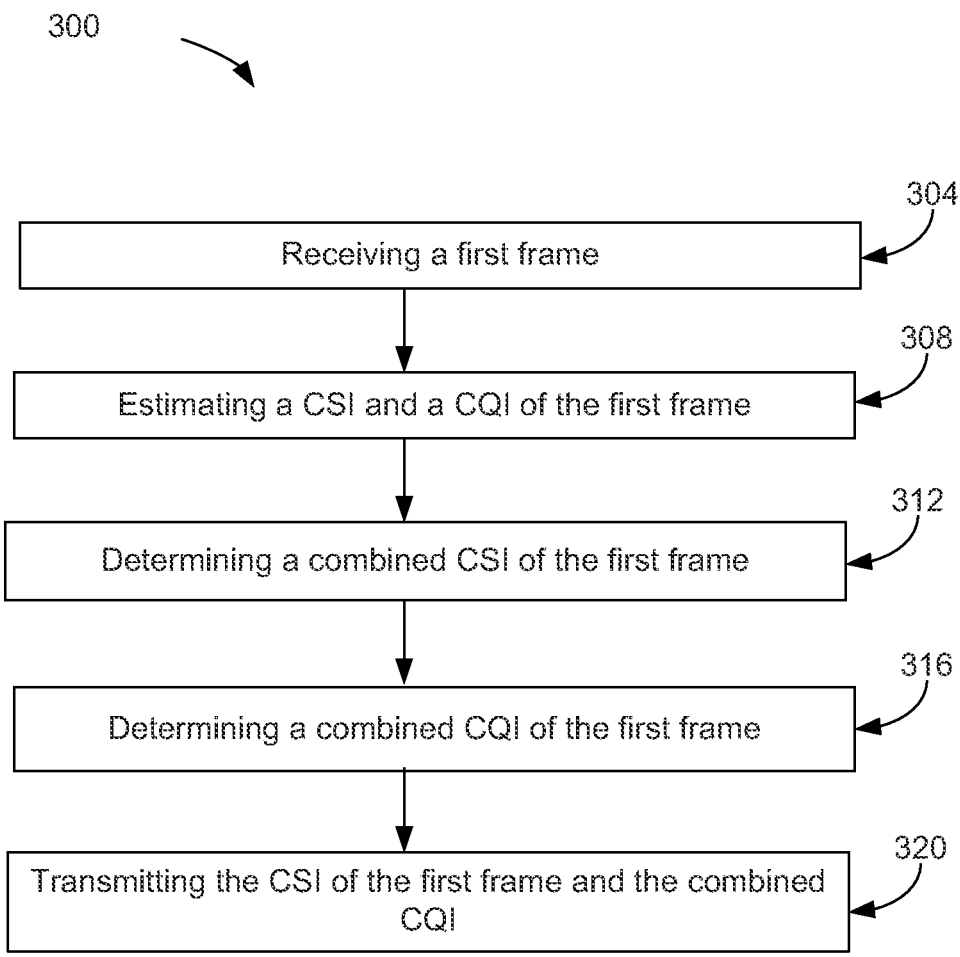
FIG. 3 illustrates an exemplary method for operating a user equipment of FIGS. 1 and 2, in accordance with various embodiments of the present disclosure.

FIG. 3 illustrates an exemplary method 300 for operating the UE 140 of FIGS. 1 and 2, in accordance with various embodiments of the present disclosure. Referring to FIGS. 1-3, in various embodiments, the method 300 includes, at 304, receiving, e.g., by the receive antennas 134a and/or 134b, from the BS 104, e.g., from the transmit antennas 108a, ..., 108d, a first frame (e.g., frame ai). Although not illustrated in FIG. 3, a second frame (e.g., frame a(i−1)) may be received prior to receiving the first frame.

The method further includes, at 308, estimating a CSI and a CQI of the first frame. For example, the UE CSI estimation module 148 may estimate the CSI of the first frame (e.g., using equation 1), and the UE CQI estimation module 152 may estimate the CQI of the first frame.

The method further includes, at 312, determining, e.g., by the UE CSI combination module 156, a combined CSI of the first frame using, for example, equations 2 and 3. In various embodiments, the combined CSI of the first frame may be based at least in part on the CSI of the first frame and a CSI of the second frame. In various embodiments, the combined CSI of the first frame may also be based at least in part on an estimation of a Doppler spread of the channel 130 between the BS 104 and the UE 140. For example, if the estimated Doppler spread is higher than the previously discussed threshold value, the combined CSI of the first frame may be equal to the CSI of the first frame (i.e., $b0=1$, and $K=1$ in equations 2 and 3). On the other hand, if the estimated Doppler spread is lower than the threshold value, the combined CSI of the first frame may be a weighted average of the CSI of the first frame and the CSI of the second frame (e.g., non-zero $b0$ and $b1$, and $K \geq 2$ in equations 2 and 3). In various embodiments and as illustrated in FIG. 1, the UE Doppler spread estimation module 164 in the UE 140 may estimate the Doppler spread of the channel 130. In various other embodiments and as illustrated in FIG. 2, the BS Doppler spread estimation module 124 in the BS 104 may estimate the Doppler spread of the channel 130, and transmit the estimated Doppler spread to the UE 140.

The method further includes, at 316, determining, e.g., by the CQI combination module 160, a combined CQI of the first frame. For example, the CQI combination module 160 may determine the angle $\theta i$ between the combined CSI and the CSI of the first frame, and the combined CQI may be a ratio of the CQI of the first frame and a square of the cosine of the determined angle θi, as illustrated in equations 4 and 5.

The method further includes, at 320, transmitting, e.g., using the transmit antenna 136 of the UE 140, the CSI and the combined CQI of the first frame to the receive antenna 110 of the BS 104.

Figure 4:
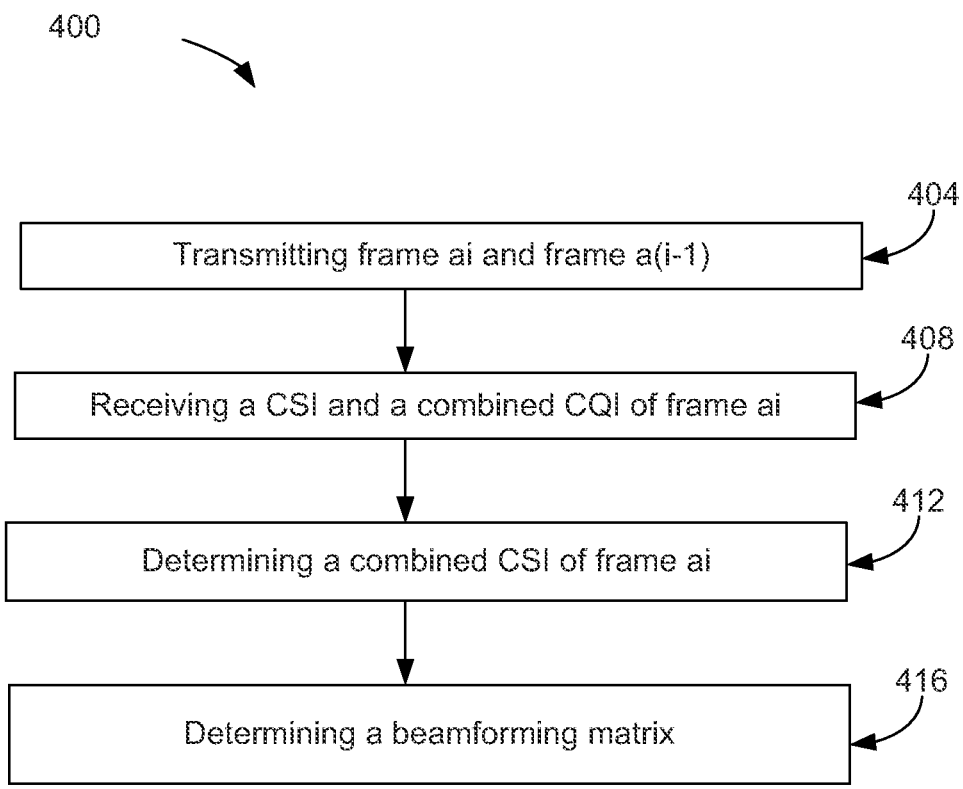
FIG. 4 illustrates an exemplary method for operating a base station of FIGS. 1 and 2, in accordance with various embodiments of the present disclosure.

FIG. 4 illustrates an exemplary method 400 for operating the BS 104 of FIGS. 1 and 2, in accordance with various embodiments of the present disclosure. Referring to FIGS. 1, 2 and 4, in various embodiments, the method 400 includes, at 404, transmitting, by the transmit antennas 108a, ..., 108d, frames ai and a(i−1) to the UE 140 over channel 130. As previously discussed, frame a(i−1) may be transmitted prior to transmitting frame ai.

The method further includes, at 408, receiving, by the receive antenna 110 of the BS 104, the CSI(i) and CQI_combined(i) from the UE 140.

The method further includes, at 412, determining, e.g., by the BS CSI combination module 120, a combined CSI of frame ai (i.e., determining CSI_combined_BS(i)) based at least in part on the CSIs of frames ai and a(i−1). In various embodiments, the combined CSI of the frame ai may be determined, e.g., using equations 2 and 3, based at least in part on an estimation of a Doppler spread of the channel 130. In various embodiments, the estimation of the Doppler spread may be provided by the BS Doppler spread estimation module 124. For example, if the estimated Doppler spread is higher than the previously discussed threshold value, the combined CSI of the frame ai may be equal to the CSI of the frame ai. On the other hand, if the estimated Doppler spread is lower than the threshold value, the combined CSI of frame ai may be a weighted average of the CSIs of at least the frames ai and a(i−1). In various embodiments, the combined CSI of the frame ai (i.e., CSI_combined_BS(i)), as determined by the BS CSI combination module 120, may be substantially equal to another combined CSI of the current frame that is determined by the UE CSI combination module 156. That is, for example, the BS CSI combination module 120 and the UE CSI combination module 156 may be synchronized or configured such that the two modules use same parameters (e.g., similar weighting coefficients b0, ..., b(K−1), similar value of K, and/or similar threshold for comparing with the estimated Doppler spread) while determining the combined CSIs of various frames.

The method further includes, at 416, determining a beamforming matrix, e.g., by the beamformer module 112, based at least in part on the determined combined CSI and the received combined CQI of frame ai. Although not illustrated in FIG. 4, the beamforming matrix may be used to weight data stream(s), prior to transmitting the data stream(s) to the UE 140 using transmit antennas 108a, ..., 108d.

Although FIGS. 3 and 4 illustrate determining the combined CSI and/or the combined CQI using CSIs and/or CQIs of only two frames (e.g., the first and second frames, and frames ai and a(i−1)), in various embodiments, CSIs and/or CQIs of more than two frames (e.g., frame a(i−2), transmitted prior to transmission of frame a(i−1)) may also be used to determine the combined CSI and/or the combined CQI.

Figure 5:
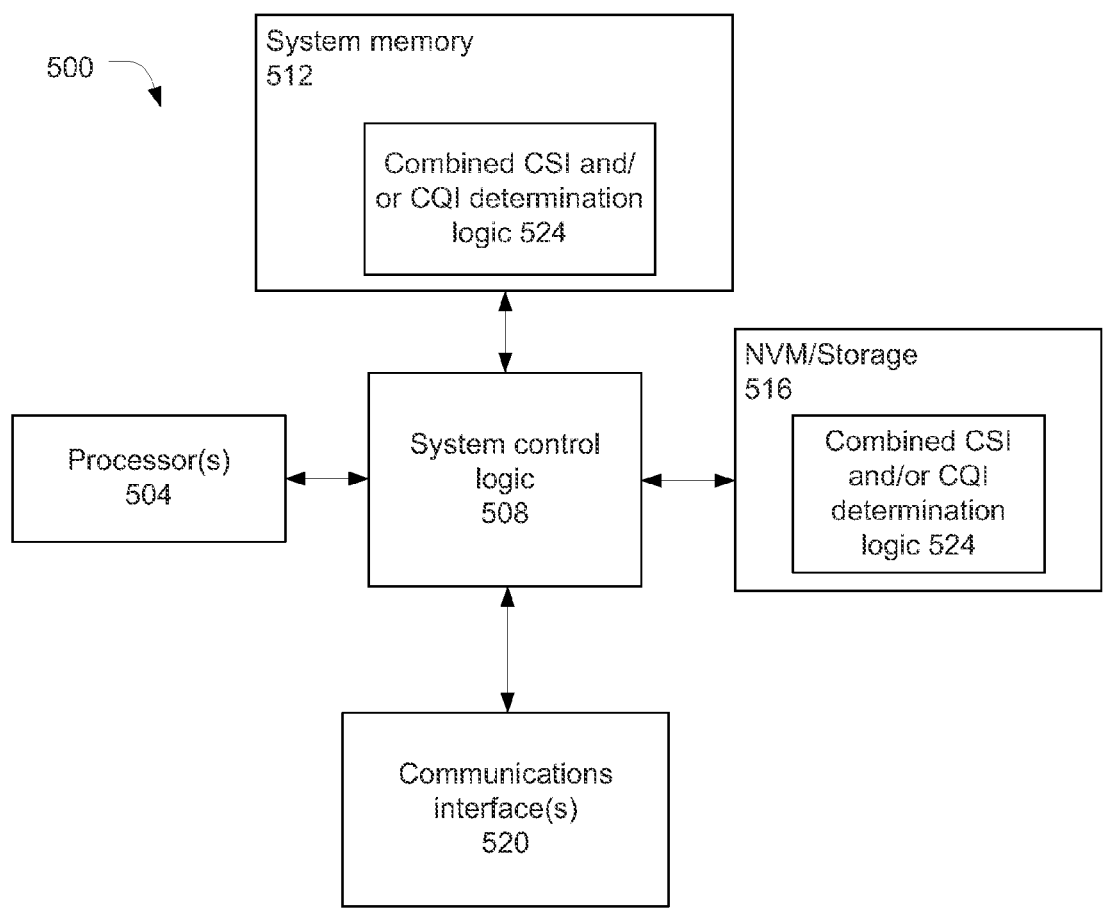
FIG. 5 illustrates an example system capable of implementing a communication device, in accordance with various embodiments of the present disclosure.

The communication devices (e.g., the BS 104 and/or the UE 140) described herein may be implemented into a system using any suitable hardware and/or software to configure as desired. FIG. 5 illustrates, for one embodiment, an example system 500 comprising one or more processor(s) 504, system control logic 508 coupled to at least one of the processor(s) 504, system memory 512 coupled to system control logic 508, non-volatile memory (NVM)/storage 516 coupled to system control logic 508, and one or more communications interface(s) 520 coupled to system control logic 508.

System control logic 508 for one embodiment may include any suitable interface controllers to provide for any suitable interface to at least one of the processor(s) 504 and/or to any suitable device or component in communication with system control logic 508.

System control logic 508 for one embodiment may include one or more memory controller(s) to provide an interface to system memory 512. System memory 512 may be used to load and store data and/or instructions, for example, for system 500. System memory 512 for one embodiment may include any suitable volatile memory, such as suitable dynamic random access memory (DRAM), for example.

System control logic 508 for one embodiment may include one or more input/output (I/O) controller(s) to provide an interface to NVM/storage 516 and communications interface(s) 520.

NVM/storage 516 may be used to store data and/or instructions, for example. NVM/storage 516 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s) for example.

The NVM/storage 516 may include a storage resource physically part of a device on which the system 500 is installed or it may be accessible by, but not necessarily a part of, the device. For example, the NVM/storage 516 may be accessed over a network via the communications interface(s) 520.

System memory 512 and NVM/storage 516 may include, in particular, temporal and persistent copies of combined CSI and/or combined CQI determination logic 524, respectively.

In various embodiments, the system 500 may be a part of the UE 140, and the combined CSI and/or combined CQI determination logic 524 may include instructions that when executed by at least one of the processor(s) 504 result in the system 500 estimating a CSI and a CQI of the first frame, determining a combined CSI of the first frame, determining a combined CQI of the first frame, and transmitting the CSI of the first frame and the combined CQI, as previously discussed herein.

In various other embodiments, the system 500 may be a part of the BS 104, and the combined CSI and/or combined CQI determination logic 524 may include instructions that when executed by at least one of the processor(s) 504 result in the system 500 transmitting frame ai and frame a(i−1), receiving a CSI and a combined CQI of frame ai, determining a combined CSI of frame ai, and determining a beamforming matrix, as previously discussed herein.

In some embodiments, the combined CSI and/or combined CQI determination logic 524 may additionally (or alternatively) be located in the system control logic 508.

Communications interface(s) 520 may provide an interface for system 500 to communicate over one or more network(s) and/or with any other suitable device. Communications interface(s) 520 may include any suitable hardware and/or firmware. Communications interface(s) 520 for one embodiment may include, for example, a network adapter, a wireless network adapter, a telephone modem, and/or a wireless modem. For wireless communications, communications interface(s) 520 for one embodiment may use one or more antennae.

For one embodiment, at least one of the processor(s) 504 may be packaged together with logic for one or more controller(s) of system control logic 508. For one embodiment, at least one of the processor(s) 504 may be packaged together with logic for one or more controllers of system control logic 508 to form a System in Package (SiP). For one embodiment, at least one of the processor(s) 504 may be integrated on the same die with logic for one or more controller(s) of system control logic 508. For one embodiment, at least one of the processor(s) 504 may be integrated on the same die with logic for one or more controller(s) of system control logic 508 to form a System on Chip (SoC).

In various embodiments, system 500 may have more or less components, and/or different architectures.

Although certain example methods, apparatus, and articles of manufacture have been described herein, the scope of coverage of the present disclosure is not limited thereto. On the contrary, the present disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:
   receiving a first frame by a wireless transmission;
   estimating a channel state information (CSI) and a channel quality indicator (CQI) of the first frame;
   determining a combined CSI of the first frame based at least in part on:
   the CSI of the first frame and a CSI of a second frame that was received prior to receiving the first frame; and an estimation of a Doppler spread of a communication channel between a base station and a user equipment;
   determining a combined CQI of the first frame based at least in part on the CQI of the first frame and the combined CSI, wherein said determining the combined CQI includes: determining an angle between the combined CSI and the CSI of the first frame; and determining the combined CQI as a ratio of the CQI of the first frame and a square of a cosine of the determined angle; and
   transmitting the CSI of the first frame and the combined CQI.

2. The method of claim 1, wherein said determining the combined CSI further comprises:
   if the estimated Doppler spread is higher than a threshold value, determining the combined CSI to be equal to the CSI of the first frame; and
   if the estimated Doppler spread is lower than the threshold value, determining the combined CSI to be a weighted average of the CSI of the first frame and the CSI of the second frame.

3. The method of claim 1, further comprising:
   estimating, by the user equipment, the Doppler spread of the communication channel between the base station and the user equipment.

4. The method of claim 1, further comprising:
   receiving, by the user equipment from the base station, the estimation of the Doppler spread of the communication channel.

5. The method of claim 4, wherein said receiving the estimation of the Doppler spread further comprises:
   receiving a single bit estimation from the base station, wherein the single bit estimation includes information on whether the estimated Doppler spread is higher than or lower than a threshold value.

6. The method of claim 1, wherein said determining the combined CSI further comprises:
   determining the combined CSI based at least in part on the CSI of the first frame, the CSI of the second frame, and CSIs of one or more additional frames that were received prior to receiving the second frame.

7. A method comprising:
   transmitting a plurality of frames including a first frame and a second frame that is transmitted prior to transmitting the first frame;
   receiving a channel state information (CSI) and a combined channel quality indicator (CQI) of the first frame;
   determining a combined CSI of the first frame based at least in part on:
   the CSI of the first frame and a CSI of the second frame; and
   an estimation of a Doppler spread of a communication channel between a base station and a user equipment; and
   determining a beamforming matrix based at least in part on the determined combined CSI and the received combined CQI,
   wherein determining the combined CSI of the first frame further includes:
   if the estimated Doppler spread is higher than a threshold value, determining the combined CSI to be equal to the CSI of the first frame; and
   if the estimated Doppler spread is lower than the threshold value, determining the combined CSI to be a weighted average of the CSI of the first frame and the CSI of the second frame.

8. The method of claim 7, further comprising:
   estimating the Doppler spread of the communication channel.

9. The method of claim 7, wherein determining the combined CSI of the first frame further comprises:
   determining, by a base station, the combined CSI of the first frame such that the determined combined CSI of the first frame is substantially equal to another combined CSI of the first frame that is determined by a user equipment.

10. A mobile station comprising:
    a receiver configured to receive a first frame and one or more other frames that are received prior to receiving the first frame;
    a channel state information (CSI) module configured to estimate a CSI of the first frame and CSIs of the one or more other frames; and
    a CSI combination module configured to determine a combined CSI of the first frame based at least in part on an estimation of a Doppler spread of a wireless channel between a base station and the mobile station.

11. The mobile station of claim 10, further comprising:
    a channel quality indicator (CQI) module configured to estimate a CQI of the first frame; and
    a CQI combination module configured to determine a combined CQI of the first frame based at least in part on the CQI of the first frame and the combined CSI.

12. The mobile station of claim 10, wherein the CSI combination module is further configured to determine the combined CSI based at least in part on the CSI of the first frame and CSIs of the one or more other frames.

13. The mobile station of claim 10, further comprising:
    a transmitter configured to transmit the CSI of the first frame and the combined CQI.

14. The mobile station of claim 10, further comprising:
a Doppler spread estimation module configured to estimate the Doppler spread of the wireless channel.

15. The mobile station of claim 10, wherein the receiver is configured to receive an estimation of the Doppler spread of the wireless channel from the base station.

16. The mobile station of claim 10, wherein the mobile station wirelessly communicates with the base station in accordance with advanced long-term evolution (LTE) protocol.

* * * * *